Oct. 25, 1938.  M. M. CLAPSHAW  2,134,031
PROCESS FOR PRESERVING FELLED GREEN TIMBER CONTAINING ITS NATURAL SAP
Filed July 24, 1935  3 Sheets-Sheet 1
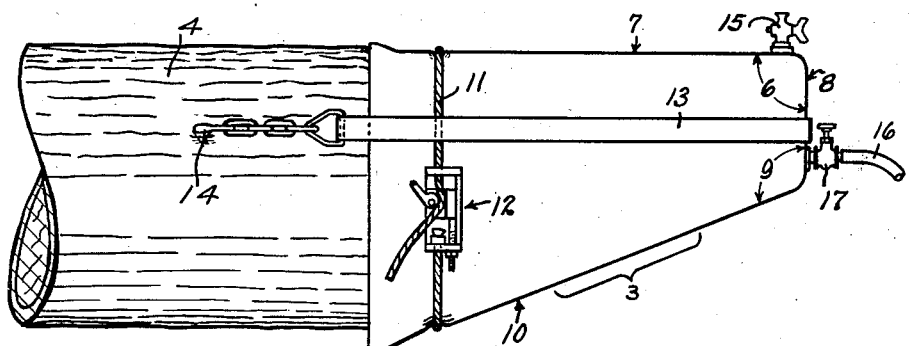
Fig. 1
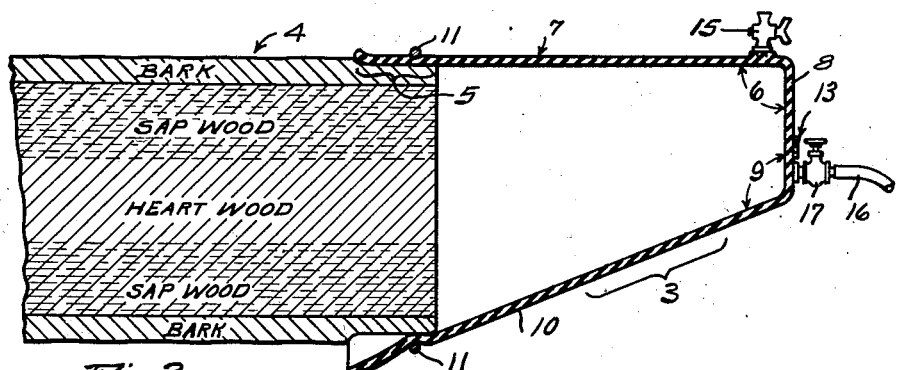
Fig. 2
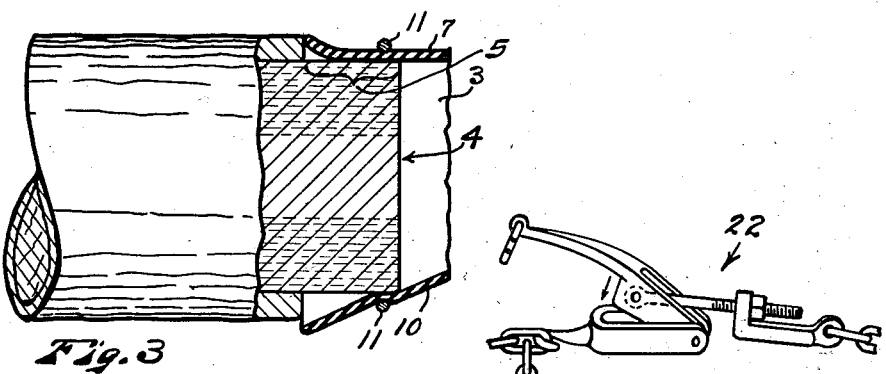
Fig. 3
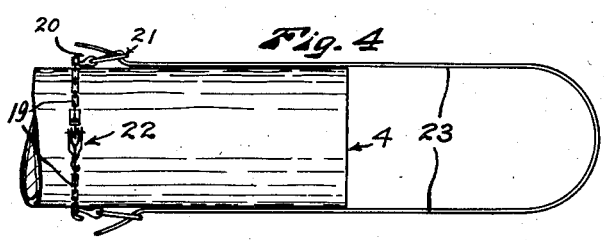
Fig. 4
Fig. 5
INVENTOR.
Myron M. Clapshaw
ATTORNEY

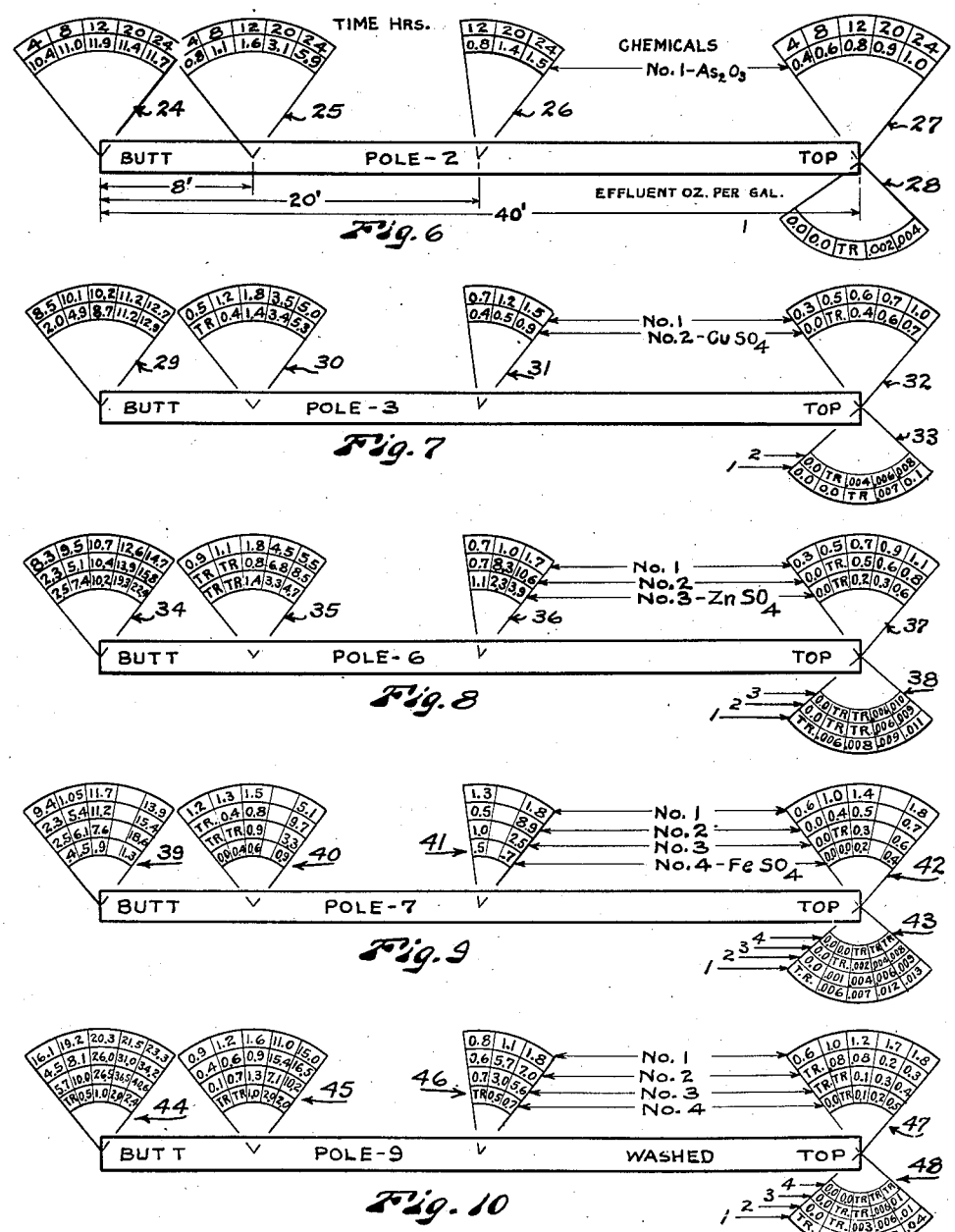

Oct. 25, 1938.    M. M. CLAPSHAW    2,134,031
PROCESS FOR PRESERVING FELLED GREEN TIMBER CONTAINING ITS NATURAL SAP
Filed July 24, 1935    3 Sheets-Sheet 3

INVENTOR.
Myron M. Clapshaw
BY
G. Wright Arnold
ATTORNEY

Patented Oct. 25, 1938

2,134,031

UNITED STATES PATENT OFFICE 2,134,031

PROCESS FOR PRESERVING FELLED GREEN TIMBER CONTAINING ITS NATURAL SAP

Myron M. Clapshaw, Portland, Oreg., assignor to Mineralized-Cell Wood Preserving Company, a corporation of Delaware Application July 24, 1935, Serial No. 32,914

28 Claims. (Cl. 21—26)

My invention relates to the process of preserving felled green timber containing its natural sap. More particularly, my invention relates (a) to supplying the sap wood portion of felled green timber, containing its natural sap, with an aqueous solution of an oxide of arsenic and a non-alkali metallic salt and/or salts, and (b) to causing the deposition within the wood treated portion of an arsenic oxide by one or more non-alkali metallic salts in suitable quantities, and/or the forming of a reaction product between the sap wetted wood tissue and/or sap, on the one hand, and said chemicals on the other, and these in such relatively non-leaching form and in suitable quantities, and in such uniformity of distribution as to provide the required degree of toxicity throughout the wood treated portion as is required for the preservation of such wood against the action of wood destroying agents, both in the form of decay producing fungi and wood consuming animal agents. By "decay producing fungi" I refer to species of the vegetable kingdom and by "animal agents", I refer to insects, borers and other wood eating agents of the animal kingdom, as typified by termites, teredoes, limnoria, etc.

My process does not apply to standing live timber. The timber must be filled to provide an end for applying the chemicals, and the other end must be cut to permit the escape of the fluids. The cell structure of the timber has ducts longitudinally directed of the timber, and in the case of a live tree, the insertion of any chemicals through a hole radially directed does not provide for the impregnating of the tree uniformly cross-sectionally considered, since the cell ducts extend longitudinally of the timber. Furthermore, a standing live tree only has a substantial flowing circulation during certain months of the year. In other months the flow is so slow that the period of treatment would be of such length that it would be wholly impractical. Such process would allow too great time for interaction of the chemicals while in the mixing tanks and reservoir apparatus.

The tendency to decay in the case of telephone poles, piling, ties, and in fact all wood units which come into contact with the elements, such as soil, heat, water or air, or any combination thereof, and the consequent loss of such wood units when exposed to the action of termites, teredoes, limnoria, and other wood destroying insects or borers, are facts well known. The replacement of wood so destroyed, when built into structures, is extremely expensive, often greater than the original installation, a continuing annual burden, and is resulting in the early and wasteful exhaustion of that important natural resource, the forests. Many attempts have heretofore been made to extend the life of wood material and to overcome the above objections, most of which involve extensive plant equipment and expensive operations and costly transportation due to necessity of shipping timbers to treating plant and re-shipment after treatment. Also, other objections are that there is only a relatively thin layer of the sap wood treated, or there is an insufficient quantity of the toxic or preserving chemicals supplied and formed into non-leaching compounds to properly preserve the wood for a desirably long period of time; or in attempting to get the chemicals into the wood, the wood cells have been so drastically treated by heating and by pressure and vacuum, or by such strong chemicals as to greatly lessen the strength of the pole or wood unit.

For example, the method of treating wood ordinarily followed in commercial practice, is that of creosoting. In this process the wood units are generally heated in tanks or retorts. Often this is under vacuum at excessive temperatures. Such procedure strains and often ruptures the cell walls. Next, heated creosote is added to the retort so as to immerse the wood unit; then after a certain interval, pressure is added to drive the creosote into the cells. So severe is this treatment that engineers allow for a marked decrease in the strength of wood units so treated. Such treatment even then only supplies a relatively thin outer band of treated wood.

In contrast with such method, my process treats all of the sap wood portion of the pole by passing the chemicals longitudinally of the cells. The method of supplying the chemicals longitudinally of the sap wood cells, although long known in the literature, has heretofore been subject to such objections as to compel resorting to creosoting or immersion and vacuum treating processes, even though the same be highly objectionable for many reasons, and is injurious to the wood strength, and even though such process only provides what may be described as a "skin deep" penetration treatment on the pole, and even though said creosote chemical causes such severe burns upon workmen handling and climbing the creosoted poles as to necessitate hospitalization.

In attempting to employ the method of introducing the chemicals to all of the sap wood portion of the pole by causing such chemicals to penetrate longitudinally of the cells of microscopic size throughout the length of the pole, or for such length as may be desired, by introducing them over the restricted area represented by the annular ring of the cross sectional area of the sap wood at the butt, presents a severe problem.

By introducing in a felled green tree, at substantially normal temperatures, the chemical solution under artificial pressure at the end of a pole over the relatively small area represented by the mere cross-sectional area of the sap wood to the whole cubical mass of the sap wood of the pole longitudinally of its fibers, is going contrary to the approved commercial practice of immersion wherein the largest area possible is sought, even by providing hundreds of perforations in the pole to facilitate the penetration of the solution. Thus, it is to be understood my process invention for wood treating involves two inseparable features: (a) the passing of the chemicals under artificial pressure lengthwise of the microscopic cells, and (b) the character of the chemical solution capable of being so passed, which solution also has some and/or all of the properties herein specified.

Briefly stated, the problem respecting the solution of chemicals which will have the desired properties and which will operate in so passing lengthwise of the cells is:

(1) The discovery of such a solution which is toxic to wood destroying animal agents and decay producing fungi.

(2) The discovery of chemicals having such character, and at the same time capable of remaining in solution at or near normal temperatures, and must not be so reactive towards each other that they prematurely precipitate each other before they can flow lengthwise of the cell structure of the pole or timber. Some solutions may be capable of impregnating the wood if the temperature is raised excessively high, but such solutions are inoperative for the purposes herein, because they injure the wood.

(3) The discovery of chemicals having the herein described characteristics, which are also capable of either reacting with the wood and/or its sap, and/or inter se, and be caused to form relatively non-leaching compounds, and these in such quantities as will preserve the wood against decay and/or wood destroying animal agents, so that such wood has a life a plurality of times longer than when untreated. The treated wood, when used in tide waters, must withstand the severe leaching out action due to the ebb and flow of the tide and of the wave action which constantly causes a washing effect upon the cellular structure of the pole. While the chemicals must be so fixed in the pole as to provide toxicity for teredoes, limnoria, etc., when the pole is disposed in water, yet applicant has had to discover a solution which could be fixed in the cells of telegraph poles and not be dangerous to cattle and livestock, which are prone to seek salty tasting compounds.

(4) The discovery of chemicals having the herein described properties, and which also are relatively inexpensive and available commercially in relatively large quantities.

(5) The discovery of such chemical solution having the herein described properties or characteristics, and at the same time is capable of being applied to and with uniform distribution throughout the sap wood portion of the felled green tree at any time of the year, i. e., whether the sap of the timber is flowing or not. Uniformity is most important, because obviously if a wood unit as a whole cannot be depended upon, it is useless. It might become destroyed at a point where the stresses are the greatest, and therefore would give way.

(6) The discovery of such chemicals having the herein described properties which may be passed through the sap wood portion within a reasonable time and without undue loss or waste of the chemicals, and yet will react with the wood, and/or its sap, and/or inter se, and not simply pass through the pole.

(7) The discovery of chemicals having the herein described properties and which at the same time are non-injurious to the wood, non-staining upon contact with other goods, and do not emit contaminating or objectionable odors, and are not offensive to workmen during treatment, or not injurious to the workmen who handle the treated product.

(8) The discovery of chemicals having the herein described properties and which may be prepared and injected into the wood by means of a simple and portable plant, operable at isolated points.

(9) The discovery of chemicals having the herein described properties, and which at the same time may be applied in the form of a solution principally formed of water. The importance of the solution being primarily of an aqueous character is that it provides for a non-injurious to wood medium and the desirable economical preparation of the solution as well as being a medium available at remote points.

(10) The discovery of an effective impregnating treatment involved the overcoming of the checking of the wood upon drying. It will be remembered that the heart of the wood comprises compact dried cell structure. Surrounding this is the sap annular ring portion. Without treatment it is obvious that as the sap annular ring portion dries out it will shrink, but since the heart section is already composed of dried out compact cells, it is not readily compressible and does not yield, and therefore, the contracting annular sap ring portion is ruptured, and radially disposed cracks develop. Applicant's invention results in supplying such a combination of chemicals with the cellular structure and contents of the sap ring portion, that such shrinking is so reduced and/or the wood so strengthened that objectionable checking is prevented.

It should be noted that marine borers, as teredoes and/or bankia develop a long thin walled body, often longer than two feet and more than one-half inch in diameter, and it is understood that it draws sea water lengthwise through its body, using this means to move within its body the wood cuttings. These cuttings are made by the opposite or boring end of its body. The water after being drawn in is expelled through the end of the body by way of which the water entered. At the time the animal enters the wood it may be very small, so that the opening is of extremely small proportions, and once it begins to grow, it works entirely on the inside of the pole and gives practically no evidence of its presence. This often accounts for the sudden unexpected collapse of wharf structures. Obviously, the natural operation of the teredo, in drawing in a stream of water and expelling the same, has a diluting action upon the toxic qualities of any chemicals with which the wood may be impregnated. This emphasizes the need of a sufficient quantity impregnation of the toxic chemicals to allow for dilution, and it also emphasizes the need of a strongly toxic chemical, as well as emphasizes the difficulties in general.

A primary purpose of my invention is to overcome the objections to present day practice in the preserving of wood and to provide a process which will meet all of the exacting requirements as above set forth, and as may otherwise be inherent in the problem.

A further primary object of my invention is to provide a chemical solution of toxic and fixing agents of a wood-non-injuring character, which agents will so react with the wood having its sap and/or react with the sap, and/or which will react inter se within the sap wetted cells of the wood and yet having a delayed time reaction period such that the solution may be applied under pressure over the cross section of the timber sufficient to force the said solution through the sap wood portion of the timber longitudinally of the cell structure, whereby the timber is preserved against the action of wood destroying agents and its life prolonged a plurality of times longer than when the timber is untreated.

A further primary object of my invention is to provide such a chemical solution as is set forth above in which at least some of the agents function not only as toxic agents, but also to increase the quantity of the arsenic, and other toxic compounds which may be supplied to the pole, and also functions as fixing agents, i. e., function to form relatively nonleaching compounds when applied to the sap wood thereby providing an accumulative toxic and fixing action.

Further, a primary purpose of my invention is to provide a process for treating felled green timber which is adapted for treating such timber, if desired, at or near the site where the same is cut, and then shipped direct to the point of use, or for treating such timber, if desired, at a point to which said felled green timber may be readily and economically transported, without the same drying out prior to being treated.

Also, in providing the chemical solution embodying my invention, a primary object is to provide a chemical solution which satisfies the requisite that it be of a character which permits it to enter the sap wood part of a felled green timber at one end, while the liquids are free to escape from the opposite end and pass longitudinally of the cell structure in a reasonable length of time. Such solution must be of the character herein described, and reactive with and/or within the wood structure to form a compound of such degree of insolubility that it is substantially non-leachable by the natural weathering elements (wind, rain, sunshine, heat and cold) thereafter, even with the lapse of years, and at the same time such reaction compound must have such degree of solubility that it will have toxic effects within the organisms of wood enemies. A nice balance must be provided between the amount of insoluble and soluble portions of the solution, and while this balance is being provided, the solution must be of a character that it will not be prematurely precipitated, either in the storage or mixing tanks, or in the pole itself before the treating operation may be extended lengthwise to the point desired. But while these various factors must be provided, the solution must be of a character to permit the deposition within and/or the chemical union with the wood and/or sap of such quantities of the chemicals as have been found necessary to insure the preservation of the wood against decay and the attack of the wood enemies. Furthermore, these quantities are specified by engineers and include an amount to satisfy the safety factor to provide for emergencies. This "quantity" factor is critical because obviously, irrespective of how well the solution may meet the other requirements, if the solution cannot provide a sufficient quantity of the reaction product and this of the required character, then it would not be of commercial value, because only when certain quantities are present are teredoes, termites, decay producing fungi and other destructive forces prevented from destroying the pole.

Ordinary State and Government specifications to resist teredoes and other boring enemies call for about twelve pounds of creosote per cubic foot of the wood treated for ordinary conditions. This amount will be varied, depending upon the degree to which the body of water, in which the piling is to be driven, is infested with such teredoes and other boring enemies. State engineers have approved the invention herein set forth and in accordance with rigid requirements involved in wood preservation have specified that, at the top portion of the pole desired to be treated, there should be present, of the chemicals involved in the present invention, four ounces of the arsenic chemical, six ounces of copper chemical, and six ounces of the zinc chemical. Thus, unless a sufficient quantity of chemicals can be retained by the lengthwise process of impregnation, the process invention of applicant (which, let it be noted, has been defined above, to include both the lengthwise impregnation and the character of the chemical solution) is necessarily condemned.

For purposes of illustration and definiteness of description, I will describe my invention as applied to the treatment of piling and telegraph poles, (where term "pole" occurs hereinafter, the term "piling" is to be deemed also included, unless the context shows the contrary) but it is understood that my invention is not to be restricted to any such specific use, but is equally applicable to ties, fence posts, and other wood articles involving similar problems of treatment and conditions of use, or lumber or timbers where its use particularly requires non-decaying properties, or it is desirable to prohibit excessive season checking and other troubles which arise in seasoning, or it is necessary to protect against wood enemies, as termites, teredoes or limnoria. Of course, the treated poles may be cut into lumber or veneer sheets. Where illustrations are given after a general term, such citing of examples is not to be taken as limiting the scope of the general term, unless the context clearly indicates the contrary.

The above mentioned general objects of my invention, together with others inherent in the same, are attained by the mechanism and processes illustrated in the following drawings, the same being preferred exemplary forms of embodiment of my invention, throughout which drawings like reference numerals indicate like parts:

Figure 1 is a view in side elevation of the end portion of a pole and an apparatus attached thereto for impregnating the said pole with the solution provided by my invention;

Fig. 2 is a view in longitudinal section of Figure 1;

Fig. 3 is a view in longitudinal section of a pole with the bark removed to form a bearing for the cap;

Fig. 4 is a view in perspective of a detail of the invention;

Fig. 5 is a view in perspective of a further detail, i. e., the chain cinching device; and Figs. 6 to 14 are charts setting forth test data.

Figure 11:
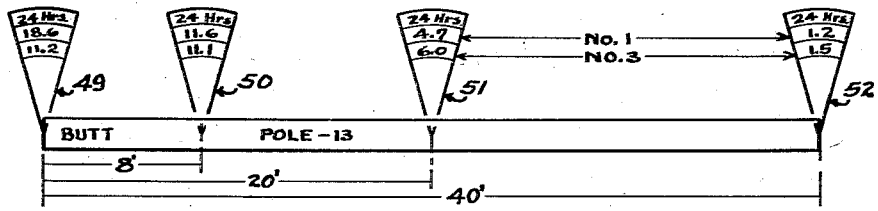

My discovery resides in providing a chemical solution of an oxide of arsenic and a non-alkali metallic salt or salts which meets the exacting requirements herein set forth, and which may be applied to the pole by the process of forcing it lengthwise of the cell structure of the sap wood portion while one end of the pole is free for the escape of the liquids.

A practical formula which I have discovered to accomplish the objects of my invention, is as follows:

| | |
|---|---|
| Arsenic trioxide (white arsenic) or any oxide of arsenic that is soluble in water _____ pounds___ | 1 |
| Copper sulphate _____ do____ | 1½ |
| Zinc sulphate _____ do____ | 1½ |
| Iron sulphate _____ ounces___ | 4 |
| Water (10 gals. water, i. e., eighty-three lbs.) _____ gallons___ | 10 |

The above formula is my preferred formula to accomplish most fully the objects of my invention, but a solution of an oxide of arsenic and a soluble non-alkali metallic salt of copper; or a solution of said oxide of arsenic and a soluble non-alkali metallic salt of zinc; or a solution of an oxide of arsenic and a soluble non-alkali metallic salt of iron; or a solution of oxide of arsenic and two or more of said non-alkali metallic salts as well as an oxide of arsenic and an equivalent of said non-alkali metallic salts is included in my invention. Arsenic is particularly toxic against wood destroying animals, but oxide of arsenic is supplied only with difficulty in lengthwise treatment in sufficient quantities to provide a sufficient supply and difficult to fix in the wood. Fixing agents when used with the arsenic tend to prematurely precipitate the chemicals, and hence deplete the solution. I have discovered how to get the required quantity of the arsenic into the wood and to fix it there in sufficient quantity and in relatively non-leaching form to preserve the wood, as will appear in the test data hereinafter set forth.

An oxide of arsenic is essential to provide the degree of toxicity or germicidal properties to more fully realize the benefits of my invention against biological enemies typified by teredoes, termites and limnoria, and also provides toxicity against decay producing fungi.

The copper sulphate particularly supplies strong preserving properties against decay producing fungi, as well as toxicity against biological wood enemies typified by teredoes, termites and limnoria. Zinc sulphate functions much as the copper sulphate in provided especially germicidal properties against decay producing fungi, and also supplies toxicity against biological wood enemies typified by teredoes, termites and limnoria.

The problem however, is not only to provide toxic agents, but toxic agents which are non-injurious to the wood and will react properly and form non-leaching compounds with the wood, and/or its sap, and/or inter se (i. e., the chemicals of the solution) and this in such quantities as to satisfy specified exacting requirements to insure preservation of the wood even after lapse of years. Oxides of arsenic are very strongly toxic and yet I have found, if used alone will not form a sufficiently non-leachable compound with the wood and/or its sap, i. e., it will relatively readily leach out of the wood with water, leaving the wood thereafter subject to decay or destruction by wood destroying agents.

Likewise, if copper sulphate alone is used to form the treating solution, it is relatively readily leachable by water, and the same is true for zinc sulphate. The addition of the copper sulphate to a solution of an oxide of arsenic in a test tube in the concentrations employed is well known to chemists to be only mildly reactive in producing a precipitate (i. e., insoluble compound). But contrary to this usual result within a test tube, I have discerned that the aqueous solution of an oxide of arsenic and copper sulphate in the concentration employed herein will form a strongly non-leachable reaction product with the sap wetted wood and/or sap and/or inter se. Thus, the copper sulphate may be regarded as acting as a fixing agent and also adds its toxic action to that of the arsenic. The zinc sulphate and oxide of arsenic solution in the test tube in the concentration employed by applicant, is more reactive than the copper in producing or precipitating an insoluble compound, yet it is relatively only mildly reactive in producing a precipitate (i. e., insoluble compound). But contrary to this usual result within a test tube, the aqueous solution of an oxide of arsenic and zinc sulphate in the concentration employed by the applicant will form a strongly nonleachable reactive product with the sap wetted wood and/or sap, and/or inter se. Hence, the zinc sulphate also adds its toxic action as well as functioning as a fixing agent.

Thus, the zinc adds to the toxicity and is a better precipitating agent for the arsenic trioxide than is the copper. While zinc sulphate is active in precipitating the arsenic, it fails to perform this function as satisfactorily as when the iron sulphate is also present. Without the iron sulphate, the zinc sulphate tends to escape from the top portion of the pole without causing the deposition of the desired quantity of arsenic. When it is attempted to provide the arsenic in excess of the ordinary requirement, experience has taught that as the treatment is continued, all of the zinc sulphate escapes from the top portion of the pole as fast as it is applied at the butt end.

I have discovered that the combination of all four chemicals helps to delay the reaction to get well timed good precipitation, i. e., not premature precipitation within the organic environment furnished by the cellular structure of the wood. Thus I provide for the required distribution of toxicity throughout the treated sap wood portion of the pole.

In conjunction with the arsenic any one or more of the non-alkali metallic salts named may be used without the others.

Furthermore, without the arsenic for use in fence posts or telegraph poles I have found that a solution of copper sulphate and zinc sulphate, provided to the extent of eight ounces per cubic foot of wood treated, will preserve the pole against decay producing fungi a plurality of years longer than one untreated.

Any arsenic oxide which is soluble in water may be used in place of the arsenic trioxide. The trioxide is a relatively inexpensive form of an oxide of arsenic, and hence is particularly adapted for the purpose herein where relatively large quantities are employed. Of course other soluble oxides of arsenic would be equivalents.

The iron sulphate apparently functions primarily as a fixing agent for the arsenic. The less leaching out of the copper sulphate and zinc sulphate may be in part explained as due to the catalytic action of the iron sulphate. The iron sulphate could be replaced by water soluble salts of aluminum, manganese or the like. However, iron sulphate is effective and very inexpensive and so fulfills well the requirements of applicant. Theoretically, there is sufficient copper and zinc sulphate to fix the arsenic oxide, but experience has taught that it is desirable for the best results also to use iron sulphate, and the test data relative leaching confirms this. As one advantage, it (iron sulphate) provides for varying the time of reaction in developing the non-leaching precipitation of part of the arsenic in the butt end half portion of the pole, and thereby provides for permitting the delayed reaction of other parts of the solution, so that the top half portion of the pole is suitably treated. It will be understood that the terms "butt end half portion" and "top half portion" are used broadly to refer to the indicated sections of the pole. In other words, the iron may reach two-thirds or more of the length of the pole from the butt end. The order of reaction with the arsenic would seem to be iron first, zinc second, and copper third.

Thus, the arsenic apparently is precipitated in a progressive manner throughout the length of the pole. This at least seems to be the explanation as suggested by experiments and test made of poles at different lengths. It will be understood that other water soluble salts of the non-alkali metallic elements, such as chlorides, acetates, etc., may be employed in place of the sulphates. Apparently the sulphates in the concentrations present provide a small quantity of sulphuric acid which strengthens the wood, and so are advantageous over the other forms of salts in this respect as well as being less expensive. This strengthening of the wood may be explained by the action upon the cellulose by said acid, developed by reaction within the wood in the small quantities present in the dilute condition, the same being somewhat analogous to that occurring in the manufacture of parchment paper and like processes.

The temperature of the solution may be either normal or heated to about 100° F.–130° F. In dissolving the arsenic, the water is heated to the boiling point because the oxides of arsenic are then much more soluble in such water. After dissolving the arsenic, the other chemicals are added, preferably while stirring or agitated. This solution cools to substantially atmospheric temperatures above freezing when applied to the pole, or may be about 100° F. to 130° F. Heating the solution does facilitate the passage of the solution through the pole, especially in such species of wood as have pitch or resin. This is thought to result from the less resistance of the resin over the exposed area of the sap wood exposed. Naturally, this feature is not important when the species of wood is not of the resinous character. In connection with wood of the species i. e., fir, cedars, pines and hemlock, generally employed for the uses hereinabove stated, it is preferred that the temperature should not be above about 120° F. Temperatures above this may have deleterious effects on the wood, depending upon the species of wood and special growing conditions, and render the process more complicated, whereas it is important that the process be of the simplest character possible, since it is often applied at points at or near the place of the felling of the timber and facilities may be limited. Ordinarily the temperature is substantially atmospheric temperature above freezing when applied to the pole or piling. Applicant particularly wishes to avoid any heating of the solution which will in anywise lessen the strength of the wood fiber, and it is one of the particular advantages of the invention that the solution may be passed through the pole at atmospheric temperatures above freezing.

The proportions above set forth are such as to provide a reaction time period very effective in supplying the chemicals in desired quantities, and in the desired condition and combination for different lengths of pole. The proportions above set forth may be varied, but with this condition as the minimum, viz., that the various ingredients must remain in solution in the water for a period of time necessary to perform the operation of treating the felled green timber, i. e., the chemicals must not prematurely precipitate out in the mixing tanks, and cap apparatus or become prematurely, within the wood cells, self-blocking to the passage of other portions of the solution. In the proportions above set forth, the solution at about 60° F. is practically saturated with arsenic trioxide. To add more water only serves to dilute the solution and thereby prolong the period of treatment. Accordingly, the amount of water employed should be kept within the fundamentally necessary lower limit of providing enough water to keep the various ingredients in solution, and should not be in such excess as to unduly prolong the period of treatment, since in such an instance there would be danger of washing the chemicals before they have time to fully develop into or form relatively nonleachable compounds within the pole.

To greatly increase the iron ingredient operates to reduce the period of time when the mixture will remain in suitable solution, so that undue precipitation occurs in the mixing tanks and treating cap apparatus, by means of which cap and pressures therein, the solution is caused to pass longitudinally through the cell structure of the sap wood portion. Besides precipitation in said receptacles there would also be too extensive premature precipitation within the butt end portion of the sap wood.

Arsenic has a relatively high efficient toxicity, to insects and wood destroying agents as teredoes, limnoria, etc., but has less effectiveness as a fungus growing preventing agent. On the other hand, the non-alkali metallic salts, such as of copper and zinc, are very efficient as anti-fungus preventives or decaying preventives, but have less effectiveness against insects and wood destroying agents as teredoes, limnoria, etc. But applicant has discovered that these can be combined and successfully passed longitudinally through the pole, and this without undue premature precipitation. Some combinations of chemicals operate to prematurely precipitate the arsenic, so that before the solution has an opportunity of passing through the cellular structure of the pole to a sufficient extent, and before the treatment of the pole is anywhere near completed, there is such a diluting of the solution by the precipitating out of the arsenic that it cannot be provided and disposed within the cellular structure of the poles in anywhere near the necessary quantity to provide effective uniform treatment. Moreover, applicant has discovered, with the use of non-alkali salt, such as salts of iron, which have slight rotting or decay preventing property, that he can employ the iron without too great a precipitation upon the arsenic, even in conjunction with the copper and other salts, and at the same time provide a precipitation within the actual pores of the wood which greatly increases the non-leachability feature.

Accordingly, applicant has developed new functional relationships between the members of the chemical solutions which he sets forth, and the wood cellular structure in which said chemicals are to be deposited or united. Also this new functional relationship obtains between the solution as a whole and the method for carrying the same into the pole longitudinally of the cells without premature precipitation, which would provide self blocking for the further passing of the chemical solution into the pole to reach portions at a distance from the end where the solution is initially applied.

In causing the reaction of the solution with the wood and/or sap of the wood and inter se within the wood of the felled green timber, I have found the apparatus shown in the drawings to be efficient and practical. This apparatus constitutes the subject matter of another copending application by me, Serial No. 720,111. Briefly, it comprises a cap 3 secured to the end of a pole 4. The butt end of the pole is trimmed to form a more or less smooth or uniform bearing. A portion of the bark, or all of the bark over the section 5 may be removed. There is no necessity for beveling off the annular edge of the end of the pole, and particularly do I not want to cut the sap wood. The form of the cap of my invention is such as to provide for fitting upon poles of varying diameters without such cutting, and at the same time of a form to prevent air cutting off access of the liquid to the sap wood disposed in the upper part of the butt end of the pole. The cap is of a form having practically a 90° angle 6 between the side 7 and the end wall 8, while the angle 9, i. e., the angle between the end wall 8 and the side 10, is preferably obtuse. In longitudinal section, the cap has substantially the form of a truncated cone, having the top side perpendicular to the plane of the ends.

The cap may be secured in position on the end of the pole by means of a wire cable or other similar means 11, the ends of which are secured by a cable tightening means 12. Also, a further securing means may be employed in the form of a U shaped member 13, having spurs or dogs 14 which may be driven into the wood to insure the fast securing of the cap to the end portion of the pole when the solution in the cap is subjected to pressure. A preferable form of this element of the apparatus is shown in Fig. 4, wherein a chain 19, provided with hooks 20 and buckles 21 disposed at about 180° apart when the chain is in place on the pole, may be secured about the pole. The end portions of strap 23, after the middle portion is passed about cap 3, may be secured to buckles 21. This avoids the use of said spurs or dogs 14 which rupture the bark and sap wood so that a leaking to some extent of the chemicals results. Chain 19 may also be provided with a cinching means 22 to make fast the said chain upon the log. An air escape valve 15 is provided, and also an inlet conduit 16 which has valve 17. The conduit 16 connects with any suitable confined receptacle in which the treating solution is contained, and to which solution fluid pressure may be applied. Upon opening the valve 17 the solution runs into the cap 3, and any confined air is then permitted to escape through valve 15, so that the cap 3 is completely filled with the treating solution. This is very important, for if there is any air allowed to remain, and which air finds lodgment against the sap wood end portion of the pole, that portion of the pole will not receive the treating solution as desired. The cap is of the form shown and described, in order to render it readily adjustable to poles of different diameters, and the upper wall is made substantially parallel to the axis of the pole in order to facilitate the complete removal of the air. When the cap 3 is completely filled with the treating solution, the valve 15 is closed. In Fig. 3 the pole has the bark removed to form a bearing 18 for the cap 3.

The fluid pressure exerted upon the treating solution is varied over a considerable range. The magnitude of the pressure obviously depends upon the density of the particular wood being treated, and the length of said pole to be treated, and this variation is not always in proportion to the length of the pole. For a forty foot pole of fir wood—full length treatment, as grown in the Pacific Northwest, four to seven pounds will be found sufficient, and ordinarily five pounds. For treating a seventy-five foot pole of such northwest fir—full length treatment, seven to twelve pounds pressure is found desirable, and ordinarily ten pounds is sufficient. For a twenty-five foot pole of such northwest fir—full length treatment, three to five pounds for such wood is found sufficient. For an eight foot butt treatment on a forty foot pole of such northwest fir, it is often preferable to use about ten pounds pressure. This shortens the time of treatment, and even though the period of treatment is shortened, it operates as a practical matter to still supply considerable of the treating solution to the upper portion of the pole, notwithstanding it is designed to only supply a butt treatment. Such treatment beyond the specified butt treatment results in little additional cost. It will be understood that different species of wood, and even different specimens of the same species will require varying pressures, depending in general upon the density of the wood, which in turn depends greatly upon variation in the wood growth. Whether the applied pressure is well adjusted, is determined by noting whether or not the rate of flow of the solution is sufficient, and this is herein elsewhere specified. The object is to not have such rate of flow as to result in washing unduly the natural soluble elements from the wood structure, as these must be retained to provide suitable interaction between the chemicals and the wood or sap or chemical inter se. The variation in wood growth is hereinafter further considered.

In commencing the treatment, the passing of the liquid is facilitated by having the cut of the log fresh at the treated end, and it is also advisable to have a fresh cut at the top or other end of the pole. If the cut is allowed to stand even as much as an hour before treating, the passing of the solution is retarded. Accordingly, it is advantageous to saw off a small section of the end of the log or pole, so that a fresh cut is provided immediately preceding the starting of the treating process. This facilitates uniformity of treatment and insures removing not only any dried condition on the end portions, but also provides for removing any exuding pitch or resin, or any foreign matter, such as oil or dirt which might be present and which would prevent the ready passing of the solution. It is also important to cut off sections periodically at the butt of the pole during treatment. This is also true for the top. In the case of fir, hemlock, cedar, pine and the like, it is particularly true and requires more frequent cutting of the sections than other species. The frequency varies, depending upon how long the pole has been cut and whether it has become partially dried out, and whether it has a particular large amount of pitch and other solidifying elements. In commencing the operation sometimes it is advisable to cut off the sections of a given pole as often as four times in twenty-four hours, and on the next pole it would only be necessary to cut off fresh sections once in said period. Other poles do not have to have sections recut until the lapse of several days, and even to the end of the full treating period. Whether or not sections must be cut is determined by whether or not the solution is flowing properly, and the rate of proper flowing of the solution is herein elsewhere specified. The object is not to have such rate of flow as to result in washing unduly the natural soluble elements from the wood structure, as these must be retained to provide suitable interaction between the chemicals and the wood or sap or chemicals inter se.

The sap wood treated with the solution herein set forth has a changed color, turning to greenish-blue color, so that the timber thus treated is readily recognized and distinguishable from one that is untreated. In time, this color fades.

The period of treatment will necessarily vary over a considerable range, depending upon length of pole and species of wood, and even varying greatly with different specimens of the same species. When it is remembered that the process involved relates to the passing of a solution longitudinally through the cell structure of microscopic proportions of the wood, even for lengths of poles as long as seventy-five feet, or more, it is not surprising that the period of treatment will necessarily vary.

In some poles having open cellular structure, which have been grown on ground well supplied with moisture, the solution may pass even through a seventy-five foot pole in as short a time as one hour, but, of course, this would not mean that the pole was sufficiently treated, even in this very favorable type of a pole. The passing of the solution would have to continue for a pole of that length, for possibly eight to ten days, depending upon the quantity of toxic chemicals desired at a specified point. On the other hand, a pole that has grown on ground that is sloping and in a crowded condition, as respects other trees, where the drainage is such as to take away very promptly what moisture may fall, and the crowded condition requires a dividing up of what little moisture does fall, so that a pole growing under such conditions would have its sap cellular structure quite compact as the tree would be partially starved, as it were. Such a pole might require even double the time just indicated. All this emphasizes the fact that in order to provide a chemical solution which may be supplied to the cells in sufficient quantities, it must be one that will not prematurely precipitate not only before entering the pole, but after it enters the pole and is in contact with the live cell walls of the pole.

For a seventy-five foot pole to have four ounces of arsenic per cubic foot of sap wood treated in the top in a full length treated pole requires ordinarily a treating period of eight to ten days. For a forty foot pole having a top diameter of about seven inches, and a butt diameter of about twelve inches, the period of treatment for four ounces of arsenic per cubic foot of sap wood in the top portion in a full length treated pole requires a treating period of three to five days, ordinarily four days. For an eight foot butt treatment of a forty foot fir pole, having a fifteen inch butt diameter and a nine inch top diameter, twelve to eighteen hours at a pressure of five to ten pounds is ordinarily sufficient to supply at the top of the eight foot butt treatment four ounces of the arsenic chemical, six ounces of the copper chemical, and six ounces of the zinc chemical.

Throughout the specification, it must be remembered that considerable variations in all figures are involved and are greatly influenced by the character of the particular wood being treated, diameter and length of the pole, time of the year the pole is cut and the species of the wood, and depending upon the density of the fiber and texture and character of the grain of the wood generally. Obviously, the more open the structure, the more readily will the chemicals pass. Nevertheless, treatment of the wood according to my invention is not restricted to the time of the year when the sap may be flowing but is applicable throughout the year.

For practical operation, a flow as determined by taking the average of seventy-five poles of about eighteen gallons per twenty-four hours in an ordinary pole 40' by 15" butt, 9" top is suitable. For full length treatment it is found that it requires about seventy-two gallons, or in time about ninety-six hours. This treatment has been found to assure the following quantity of chemicals on the basis of the chemicals of the preferred formula—4 ozs. of oxide of arsenic, 6 ozs. of copper sulphate, and 6 ozs. of zinc sulphate per cubic foot of sap wood treated. The above represents engineer's specifications of a State highway department.

In the above number of poles the extreme variation was about two days, i. e., a few took a day more, and a few took a day less than said period of 96 hours.

A fair working rule which I have found to be practical, and is one which I follow, is that for each cubic foot of sap wood being treated the flow should be about 1 to 1½ gallons per twenty four hours. It will be understood that if the flow is not at the above rate, and this occurs in a large number of poles on the ramp, then the pressure is increased to bring about such rate of flow, but if only a small percentage of the poles failed to have the proper rate of flow, as above indicated, then the treatment must be prolonged as respects these particular poles. Manifestly, the length of treatment increases the cost, and obviously this must be kept within proper limits, and ordinarily increasing the pressure, or making fresh sectional cuts will correct the improper flowing. A fundamental requisite is that sufficient solution must be introduced to the pole to provide the necessary amount of chemicals required per cubic foot of sap wood treated. In this connection, the rate of flow must not be so great as to bring about washing of the sap and natural soluble or semi-soluble elements of the sap wood, which elements are essential to provide the maximum beneficial results against leaching. The above working rule for practical purposes is not given on the basis of extreme weather conditions, i. e., neither freezing nor extremely hot. Freezing weather stops the flow of the solution, and extremely hot weather has a tendency to dry out the ends of the poles and thereby slow down the passing of the fluid. In the case of a peeled pole, on a very warm day with considerable wind, i. e., with a dry wind and a hot sun, the flow is retarded over the entire surface of the pole to a considerable depth of the sap wood. It will be remembered that the solution is of a greenish-blue color before being applied to the pole, and in the case of a full length treatment when the sap wood portion at the top end of the pole becomes of a similar color, it is very evident that the pole has received substantially the average treatment desired.

In the case of butt treatments or partial length treatments, discoloration of the surface of the peeled pole will indicate somewhat as to the distance of the pole to which the treatment has reached. In the case of unpeeled poles, borings may be taken or a small amount of bark removed. Also the effluent should be checked, and if this shows discolorations approximating the degree of color of the entering fluid, this is indication that the sap wood treatment is nearing completion of ordinary specified amounts.

The above provide working tests, but of course actual chemical analysis is necessary to make positive determination whether or not the treatment is providing the required amount of chemicals at any given point as per specification.

If the chemical analysis shows that a treated pole lacks the quantity of chemicals per cubic foot of sap wood required by a given engineer's specifications, and the treatment has been discontinued for a period of several days, (the number of days depending upon a number of factors, such as weather conditions,) then it will be understood that such pole cannot be resubjected to the treatment process, because the chemicals will have set within the cell structure, and thereafter the proper flow of the solution is impossible.

If the period of treatment above indicated is extended, while of course it cannot be extended indefinitely, nevertheless, the following table shows results of chemical analysis of treated piles, and the numbers of the piles refer to the piles of a particular ramp:

|  | Chemical ozs. per cu. ft. dry sap wood | | |
| --- | --- | --- | --- |
|  | Arsenic | Copper sulphate | Zinc sulphate |
| Pile #4 top | 6.0 | 6.8 | 14.6 |
| Pile #5 top | 5.9 | 4.8 | 10.7 |
| Pile #7 top | 7.9 | 8.8 | 15.5 |
| Pile #8 top | 5.4 | 7.2 | 13.9 |
| Pile #23 top | 7.5 | 6.8 | 11.4 |

Job: War Department Dock, Empire, Oregon.

The piles above referred to were fir piles 45' long, with minimum 14" butts and minimum 9" tops, and were given full length treatment. The period of treatment averaged about five days with an average pressure of from 5 to 7 pounds. The above data shows an ample quantity of chemicals where the particular specification was four ounces of arsenic chemical, six ounces each of copper and zinc chemicals.

A second series of tests on piles of another ramp made at a different time of the year on timber from a different location showed the following:

Arsenic, ozs. per cu. ft. (dry basis)

Pile #1 top _____ 18.7
Pile #2 top _____ 18.4
Pile #3 top _____ 18.8
Pile #4 top _____ 18.8
Pile #5 top _____ 16.7

Approximately the same quantity of the copper sulphate and zinc sulphate were present, i. e., the two together equalled about the same as the arsenic chemical alone. These tests were on fir piles 40' long, minimum 14" butts and minimum 9" tops, and were given full length treatment. The time period on these piles was 108 hours. On these particular poles, the regular standard full length treatment was completed in seventy-two hours, i. e., to provide four ounces of arsenic chemical, six ounces of copper chemical and six ounces of zinc chemical. This test was made solely to determine what amount of chemicals, particularly arsenic, could be introduced into the pole by continuing the treatment for a longer than usual period. Since the amount is four times that which is specified by engineers for actual installation in the Pacific Northwest territory, the test showed that an ample safety factor could be obtained for even the most extreme conditions.

Microscopic examination of the cells, cross-sectionally considered, indicates that the chemicals impregnate and thicken the cell walls. The best theoretical explanation of my microscopic observations is that the sap wetted cell wall has a selective reaction towards the chemicals of the flowing solution. As soon as a reaction product forms in or on the cell wall, the selectiveness is reduced and the remaining parts of the solution are more free to pass thereby to such cells as have not been reacted upon.

The prolonging of the treatment continues gradually to fill in the center of the cell. Tests seem to indicate that the chemicals thereafter are partly deposited by reaction with the sap wetted walls, partly by reaction of the chemicals inter se and partly without reaction.

Allowing the chemicals in the treated pole to complete their reaction in the forming of arsenic salts before the pole is driven as a piling, or set as a pole and thereby exposed to the leaching elements, is beneficial, although tests in the laboratory on treated poles, which have not had an opportunity to dry, indicate that relatively non-leaching compounds already have been developed. No perceptible leaching occurs even when the poles are dumped into the water immediately after treating.

Field tests, including both ground, sea and fresh water tests, and laboratory experiments have been made upon treated felled green timber and this for the most part, upon red fir, white fir, yellow fir, alder, maple, myrtle, black oak, white oak, laurel, pine, cedar, hemlock and spruce.

The reaction of the chemical solution, with the sap wood, and/or the sap, and/or inter se in the wood, is important in providing for the retention of the metallic salts. For example, I have ascertained by experiment as follows:

1. If a piece of felled green timber is washed to remove the sap thoroughly, and the piece of wood then treated with a solution of copper sulphate, I have found that practically all of the salt retained by the piece of wood may be removed by leaching with water. But when a piece of wood of the same character, with the sap unremoved, is treated with a similar solution of copper sulphate, then leaching by water fails to remove a considerable proportion of the retained salt.

2. Again, if a piece of felled green timber is washed to remove the sap thoroughly, and then the wood is treated with the formula above set forth, and aged for one week, I find that a relatively small amount of the retained metallic salts remained non-leachable by laboratory test.

On the other hand, when a similar piece of felled green timber, with the sap unremoved, is treated with a solution embodying the formula above set forth, and the pole allowed to age for one week, and borings are taken from the treated sap wood and these borings subjected to laboratory water leaching, the result was that a very much larger percent of the ingredients was found to be non-leachable.

The theoretical explanation of the unexpectedly favorable results obtained by my discovery is not positively known, involving as it does very complex organic reactions within the microscopic cells of the wood tissues, as well as in the organic digestive tracts of the wood enemies. However, my experiments indicate that the solution of an oxide of arsenic and one or more of the non-alkali metallic salts herein set forth are present in the treated sap wood portion in two forms: first, a portion of said solution reacts with the sap wetted wood cell wall or tissue, and/or with the sap, and/or the chemicals of the solution may interact inter se to form a reaction product which is a relatively non-leachable compound, and second, a portion of the solution is encased within the wood structure by said non-leachable compound. This second portion is more leachable than said first portion which forms said reaction product. Both portions possess toxic properties. Thus, the cell walls may be strongly water resisting and provide chambers or small pockets, as it were, for the retention of the more soluble portions of the solution. The soluble portion, being encased within the insoluble portion, cannot escape, and so adds to the retained toxicity under weathering conditions.

Experiments indicate that a greater amount of the formula may be introduced into the wood structure than is required to complete the reaction with the sap and wood tissue therein, and required to completely preserve the said wood tissue, so that to the extent that such chemicals are themselves present or are present in an inter se reaction product form deposited within the cells or interstices of the wood structure, they or it function or functions as an excluder of moisture, and serve or serves to reduce checking or cracking, commonly known as season checking.

Referring to the charts:

Fig. 6 is a chart showing the treatment of a pole identified in the experimental record as pole No. 2, which was given an eight foot butt treatment, and where it was desired to have at least 4 ozs. of arsenic at the top of the eight foot butt portion. This pole had its natural sap. The chart shows the number of ounces of chemical No. 1, (arsenic trioxide) per cubic foot of sap wood when the solution was formed with only arsenic trioxide, and shows the results of said treatment at different lengths of the pole and at different lengths of period of treatment.

Fig. 7 is a like chart for pole 3 showing the results when the treating solution comprised chemical No. 1 (arsenic trioxide) and chemical No. 2 (copper sulphate).

Fig. 8 is a like chart for pole 6 when the treating solution comprised chemicals No. 1 (arsenic trioxide), chemical No. 2 (copper sulphate) and chemical No. 3 (zinc sulphate).

Fig. 9 is a like chart for pole 7 when the treating solution comprised chemical No. 1 (arsenic trioxide), chemical No. 2 (copper sulphate), chemical No. 3 (zinc sulphate) and chemical No. 4 (iron sulphate).

Fig. 10 is a like chart, for pole 9 only in this instance the pole has had its sap washed out before treatment was made, and the treating solution comprised all four chemicals, No. 1 (arsenic trioxide), No. 2 (copper sulphate), No. 3 (zinc sulphate), and No. 4 (iron sulphate). The above test poles were selected because of their substantial uniformity of size and type.

In preparing the solution used for the chart shown in Fig. 6, one pound of arsenic trioxide was dissolved in ten gallons of boiling water.

In preparing the solution used for the chart shown in Fig. 7, one pound of arsenic trioxide was used with one and one-half pounds of copper sulphate and ten gallons of water, the water being boiled to dissolve the arsenic.

In preparing the solution used for the chart shown in Fig. 8, one pound of arsenic trioxide, one and one-half pounds copper sulphate and one and one-half pounds zinc sulphate and ten gallons of water were used, the water being boiled to dissolve the arsenic.

In preparing the solution used for the chart shown in Fig. 9, the preferred formula, as set forth in the above specification, was employed, i. e., the solution comprised one pound of arsenic trioxide, one and one-half pounds of copper sulphate, one and one-half pounds of zinc sulphate, four ounces iron sulphate and ten gallons of water, the water being boiled to dissolve the arsenic.

In preparing the solution used for the chart shown in Fig. 10, the same solution as in Fig. 9 was used.

The charts will now be considered in more detail: The chart of Fig. 6 has a segment 24 divided into compartments by radially and circumferentially directed lines. The figures 4, 8, 12, 20 and 24 represent in hours respectively the length of the different treating periods in the compartments reading from left to right, and the figures 10.4, 11.0, 11.9, 11.4, and 11.7 indicate the number of ounces of chemical No. 1 (arsenic trioxide) which was retained in the wood at the end of 4, 8, 12, 20 and 24 hours, respectively, at the butt of the log. Similarly segment 25 shows the results of the treatment at a point eight feet from the butt end of the log. Segment 26 omits the treatment for 4 and 8 hours, and shows the results for 12, 20 and 24 hours at a point in the log twenty feet from the butt end of the log. Segment 27 shows the results of the treatment for 4, 8, 12, 20 and 24 hours at the point forty feet from the butt end of the log i. e., at the top end of the log or pole. Segment 28 shows the liquid, which was forced through and dropped out at the end of the log, to contain, at the end of four hours, no chemical; at the end of eight hours, no chemical; at the end of twelve hours, a trace; at the end of twenty hours, .002 of an ounce of arsenic trioxide per gallon, and at twenty-four hours, .004 of an ounce of arenic trioxide per gallon.

The chart of Fig. 7 has the segment 29 similarly constructed to segment 24. However, the hour period for the radial compartments are not given, but it is to be understood follow the same order as set forth in segment 24, i. e., the first radial compartment indicates that at the end of four hours there was 8.5 ounces of chemical No. 1 (arsenic trioxide) and 2.0 ounces of chemical No. 2 (copper sulphate), and at eight hours 10.1 and 4.9 of said chemicals, respectively, etc. for the balance of the radial compartments. Segment 30 corresponds to the segment 25, i. e., to the result of the treatment at a point eight feet from the butt. Segment 31 corresponds to segment 26, showing the chemicals at 12, 20 and 24 hours to be respectively: 0.7 of chemical No. 1 and 0.4 of chemical No. 2, 1.2 of chemical No. 1 and 0.5 of chemical No. 2, and 1.5 of chemical No. 1 and 0.9 of chemical No. 2. This is for the treatment at twenty feet from the butt end of the log. Segment 32 corresponds to segment 27 in Fig. 6, however, showing the results of the treatment of both chemicals, i. e., chemical No. 1 (arsenic trioxide) and chemical No. 2 (copper sulphate). Segment 33 corresponds to segment 28 and indicates the amount per gallon of chemical No. 1 and chemical No. 2 in the liquid which dripped from the end of the pole as effluent.

The chart of Fig. 8 has the segment 34 corresponding to segment 24. However, the three chemicals are shown herein, i. e., chemical No. 1 (arsenic trioxide), chemical No. 2 (copper sulphate) and chemical No. 3 (zinc sulphate). Segment 35 corresponds to segment 25, only showing the added chemicals. Similarly segment 36 corresponds to segment 26, only showing the added chemicals, and likewise segment 37 corresponds to segment 27, only showing the added chemicals. Furthermore, segment 38 corresponds to segment 28, only showing the added chemicals per gallon in the effluent.

The chart of Fig. 9 has the segment 39 corresponding to segment 24, only showing the results of all four chemicals, as chemical No. 1 (arsenic trioxide), chemical No. 2 (copper sulphate), chemical No. 3 (zinc sulphate) and chemical No. 4 (iron sulphate). Segment 40 corresponds to segment 25, only showing the added chemicals. Segment 41 corresponds to segment 26, only showing the added chemicals. Likewise, segments 42 and 43 correspond to segments 27 and 28, respectively, only showing the added chemicals.

In the chart of Fig. 10 segments 44, 45, 46, 47, and 48 are similar to segments 24, 25, 26, 27, and 28 only showing the added chemicals in a pole with its sap washed out.

It will be understood that all the poles, of which data is shown in Figs. 6 to 14, were treated for a butt treatment to provide about 4.0 ounces of arsenic at the 8' point. The pressure about five pounds was the same in all said poles, and the quantity of chemicals used in each instance was the quantity specified in the preferred formula, i. e., where arsenic was used, one pound was used to ten gallons of water; and where said arsenic was used with another metallic salt, such as copper sulphate, then one and one-half pounds of copper sulphate was used, and where zinc sulphate was used, one and one-half pounds of zinc sulphate was used, and where iron sulphate was used, 4 ounces of iron sulphate was used. This is true for all poles, with the exception of pole 16 in Fig. 14, where it is expressly pointed out that an excessive amount of the iron sulphate was used. The water was boiled to dissolve the arsenic, and the temperature of the solution in all instances was substantially normal at the time of applying.

The charts speak for themselves and hence detailed reference is not necessary. However, it may be noted:

In reference to Fig. 6, by comparing the results of segment 24 with those shown in segment 27, it will be noted that at the end of twenty-four hours there is 11.7 ounces of arsenic trioxide in the butt end of the log, as compared to 1.0 ounce at the top, or at the end of the forty foot pole. By referring to segments 25 and 26 it is manifest that the amount of arsenic reaching points remote from the butt end of the log falls off rapidly during the first twenty-four hours. In the effluent at the end of twenty-four hours, as shown by segment 28, there is 0.004 of an ounce per gallon of chemical No. 1 (arsenic trioxide) present.

In Fig. 7 in segment 32 it is shown that when chemical No. 2, i. e., copper sulphate, is added to chemical No. 1 (arsenic trioxide) that at the end of twenty-four hours, at forty feet, as well as at the butt, at the eight foot and the twenty foot points on the pole, the quantity of arsenic trioxide deposited when the copper sulphate is also present in the solution is not greatly increased.

In Fig. 8, in comparing the results of segment 34 with those shown in 37, when the three chemicals, arsenic trioxide, copper sulphate and zinc sulphate are present in the treating solution, it is noted that there is an increase in the quantity of arsenic trioxide and copper sulphate deposited in the pole as compared to the results shown in Fig. 7 and in Fig. 6.

In Fig. 9, in comparing the results shown in segment 39 with those shown in segment 42, when all four chemicals, arsenic trioxide, copper sulphate, zinc sulphate and iron sulphate, are present in the treating solution, it is noted that, as respects the results shown in segment 37 of chart in Fig. 8, and segment 32 of the chart in Fig. 7, and segment 27 of the chart in Fig. 6, there is a considerable increase in the deposit of the arsenic trioxide, the amount being 1.8 as compared to 1.1, 1.0 and 1.0 in the corresponding segments of charts in Figures 8, 7 and 6.

These results thus show that there is a decided increase at the 40' point (in fact almost double) in the quantity of arsenic trioxide which may be deposited within the pole when the iron sulphate is added to the chemicals. Thus, the above is instructive as to the quantities of chemicals which may be deposited in the pole at different points and at different periods of time when the treatment has only as its object the providing of at least 4.0 ounces of arsenic trioxide at the 8' point in a butt treatment.

Comparing the results of the amount of the arsenic trioxide in the effluent, as shown in segment 43, as compared to that shown in segments 38 and 33, i. e., in the effluent of poles 6 and 3, it is noted that there is not a great deal of increase in the quantity of said arsenic trioxide.

In Fig. 10, i. e., pole 9, it will be noted that a considerable increase in the quantities of the chemicals were deposited in the cells of the washed pole in the period of 24 hours. This may be explained by the fact that the cells were more or less emptied of their soluble contents, so that larger quantities of the solution passed through the pole in the same length of time under the same pressure.

The leaching test hereinafter set forth will show that of the 15 ounces of arsenic deposited at the 8' point, only 3.77 ounces remained unleached. While in pole 7, where the pole was not washed, the total arsenic deposited in the 24 hour period at the 8' point was only 5.1 ounces, where a much smaller amount of fluid passed through the pole under the same pressure in the 24 hour period. But of this, the relatively large percentage, viz., 2.4 ounces remained unleached. The wastage of the solution on a washed pole is clearly shown.

Fig. 11, relating to pole 13, is a chart similar to the chart in Fig. 7, where the results of two chemicals are shown but in this instance chemicals 1 and 3 (arsenic trioxide and zinc sulphate) form the treating solution. Only the result of twenty-four hour period treatment was noted. Segments 49, 50, 51 and 52 show the quantity of the chemicals at the respective points in the log, i. e., the butt, eight feet from the butt, twenty feet from the butt, and the top, or forty feet from the butt.

Figure 12:
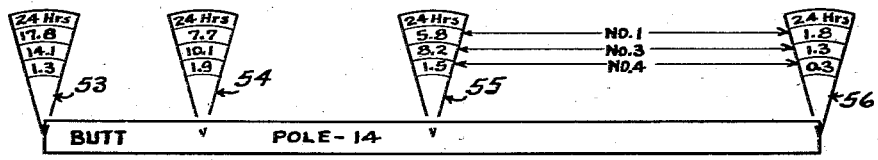

Fig. 12, relating to pole 14, is a chart similar to the chart shown in Fig. 8, where the results of three chemicals are shown, but in this instance chemicals 1, 3 and 4, i. e., arsenic trioxide, zinc sulphate, and iron sulphate, respectively, were employed to form the treating solution. Only the result of the twenty-four hour period treatment was noted. Segments 53, 54, 55 and 56 show the quantity of chemicals at the respective points in the log, i. e., the butt, eight feet from the butt, twenty feet from the butt, and the top, or forty feet from the butt.

Figure 13:
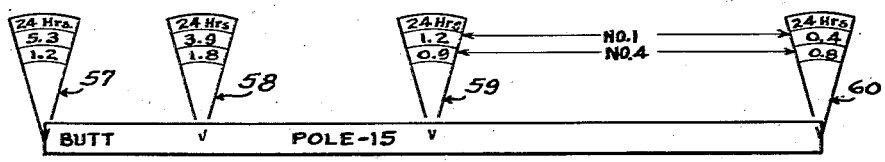

Fig. 13, relating to pole 15, is a chart similar to the chart shown in Fig. 7, where the results of two chemicals are shown but in this instance chemicals 1 and 4, i. e., arsenic trioxide and iron sulphate, respectively, were used to form the treating solution. Only the result of the twenty-four hour period treatment was noted. Segments 57, 58, 59 and 60 show the quantity of chemicals at the respective points in the log, i. e., at the butt, eight feet from the butt, twenty feet from the butt, and the top, or forty feet from the butt.

Figure 14:
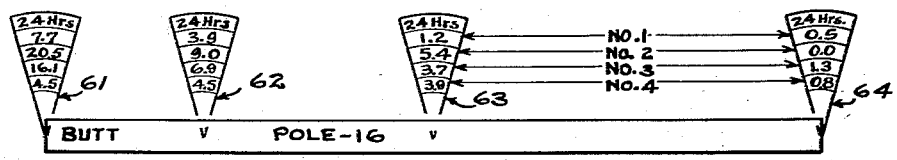

Fig. 14, relating to pole 16, is a chart similar to the chart shown in Fig. 9. While in this instance all four chemicals were employed, however, in this treatment a large excess of chemical No. 4, iron sulphate, was employed in the solution,—twelve times the preferred amount, i. e., twelve times the amount in the preferred formula set forth in the specification hereinabove. It will be noted that such excess resulted in extensive concentration of all of the chemicals in the butt of the pole. The further fact is to be added that in the cap, before the chemical solution could enter the pole, there was in this instance the precipitation of very large amounts of chemicals 1 and 4 before even reaching the pole.

From a result of the study of the data shown for pole 13, (Fig. 11) as compared with pole 3, (Fig. 7) it is manifest that in pole 13 more chemicals reached the top of the pole than in pole 3. Compared with pole 7 (Fig. 9), the preferred treatment, less of chemical No. 1 and more of chemical No. 3 reached the top.

In referring to pole 14, in comparison with pole 6, there was little difference in the amount of chemical No. 1 at the top, but more of chemical No. 3 reached the top. Compared with pole 7 the same amount of chemical No. 1 and more of chemical No. 3 reached the top.

With reference to pole 15, (Fig. 13) an additional fact is that a large part of both chemicals No. 1 and No. 4 were precipitated before reaching the pole. The function of chemical No. 4 (iron sulphate) chiefly seems to be in retaining or fixing against leaching chemical No. 1 in the pole. The omission of chemical No. 2 and No. 3 increases the speed of the reaction between chemical No. 1 (arsenic trioxide) and chemical No. 4 (iron sulphate) and the above result of premature precipitation.

In obtaining the above quantities of chemicals, borings were taken, and these subjected to standard methods of analysis.

The above results of detailed experimental tests indicate clearly that the preferred formula, viz., one pound of arsenic trioxide (white arsenic) or any arsenic oxide that is soluble in water, one and one-half pounds of copper sulphate, one and one-half pounds of zinc sulphate, and four ounces of iron sulphate dissolved in ten gallons of water, gives the best distribution of chemicals through the sap wood of the pole, and the best retention or fixing against leaching as to quantity of chemicals.

The table immediately following brings out the results of the leaching test made on borings from the above five poles at eight feet from the butt after twenty-four hour treatment, viz., poles 2, 3, 6, 7, and 9 shown respectively in Figs. 6, 7, 8, 9 and 10.

*Ounces per cubic foot dry sapwood leached*

|  | As received | Unleached | Percent leached |
|---|---|---|---|
| Pole #2—Chemical #1 | 5.9 | 1.65 | 72.0 |
| Pole #3—Chemical #1 | 5.0 | 1.62 | 67.6 |
| #2 | 5.3 | .57 | 89.2 |
| Pole #6—Chemical #1 | 5.5 | 2.28 | 58.5 |
| #2 | 8.5 | 1.65 | 80.6 |
| #3 | 4.7 | .75 | 84.0 |
| Pole #7—Chemical #1 | 5.1 | 2.40 | 52.9 |
| #2 | 9.7 | 1.70 | 82.5 |
| #3 | 3.3 | .67 | 79.7 |
| #4 | .9 | .90 | 0.0 |
| Pole #9—Chemical #1 | 15.0 | 3.77 | 74.8 |
| #2 | 16.5 | 1.40 | 91.5 |
| #3 | 10.2 | 1.03 | 90.0 |
| #4 | 2.0 | 1.56 | 22.0 |

Referring to pole 2: When only chemical No. 1 (arsenic trioxide) was used, 72% was removed by leaching in the laboratory.

Referring to pole 3: When chemicals No. 1 (arsenic trioxide) and chemical No. 2 (copper sulphate) were employed, it showed that there was then leached from the borings 67.6% of chemical No. 1 and 89.2% of chemical No. 2. This shows that copper sulphate had a fixing effect upon chemical No. 1.

Referring to pole 6: When chemicals Nos. 1, 2 and 3 (arsenic trioxide, copper sulphate and zinc sulphate, respectively) were used in the treating solution, a still less quantity of the chemicals was leached out, i. e., there was less of chemicals Nos. 1 and 2 removed by the leaching, which shows that the zinc sulphate had its effect in fixing the chemicals.

Referring to pole 7: When all four chemicals were employed, according to the preferred formula, it is manifest that there was less of the chemicals removed by leaching. For example, instead of arsenic trioxide being leached out as in pole 2, to the extent of 72%, in pole 7 there was only 52.9% leached out, and as compared with pole 3 there was only 82.5% leached out of the copper sulphate, as opposed to 89.2%, and as to the zinc sulphate, there was only 79.7% leached out as compared with 84% in pole 6.

It is to be remembered that the utility of an invention of the character herein set forth is dependent upon not only getting toxic elements into the pole, but it is dependent upon getting them there in such quantities as to be effective, and then they must be so deposited within the pole as to be relatively non-leachable. The laboratory leaching tests, it must be noted, are much more severe than would be encountered in nature, as these tests are on small borings, and thus exposing more surface to the action of water than obtains in actual exposure in use.

Referring to pole 9, where all four chemicals were used in connection with the pole from which the sap had been washed, it is manifest that the chemicals were leached out to a far greater extent than when the pole was treated with the natural sap in the wood. For example, as opposed to pole 7, where only 52.9% arsenic trioxide was leached, in pole 9, 74.8% was leached out. As to chemical No. 2 in pole No. 7, 82.5% was leached out, as opposed to 91.5% in pole 9. In pole 7 only 79.7% of zinc sulphate was leached, whereas in pole 9, 90.0% was leached out, and as to the iron sulphate in pole 7, 0.0% was leached, whereas in pole 9, 22% was leached out. These figures leave no doubt of the importance of the presence of the sap in providing for a non-leaching of the chemicals in question.

Obviously, my invention is further characterized by the advantage that there is no portion of the chemical adhering to the exterior of the wood and is not, therefore, a continuing menace to cattle or other animals. Where attempts have been made to provide a preserving chemical to be applied to the exterior of the wood, which chemical is of a poisonous character, a serious objection has obtained because the cattle are tempted to lick the same, owing to its salty character. Furthermore, such exteriorly applied preserving chemicals often result in poisoning the operators engaged in handling the timber thus treated.

Furthermore, the chemical composition embodying my invention is free of the objection of obnoxious odors.

In the case of other solutions commonly employed in preserving timber, particularly creosoting, serious objection obtains to the obnoxious odors, particularly while the same is in transfer on a ship. For example, a cargo of coffee or flour, or like food products, cannot be shipped on the vessel having a cargo of creosoted treated timber, because the said odors are absorbed to such an extent by such food products as to seriously impair the value of said products. Even storing such food products in warehouses where creosoted timbers are present has rendered such products highly objectionable, and naturally reduced their value. This is a most important consideration, because vessels running to countries where such food products are imported or exported, cannot well carry piling or timbers, which are creosoted, as a cargo. Such a chemical so contaminates the vessel that the return cargo of such food products as coffee, flour, etc. would be seriously damaged.

A further highly important advantage of this method of treatment, is that the surface of the pole or timber is left in condition to receive paint. This is not practical with other commonly employed solutions, particularly creosote.

Furthermore, experimentation has proven that a pole treated according to my invention has distinctly increased fire resistant qualities as compared to a pole untreated.

In treating a pole, it is to be understood that it is the sap wood portion of the pole that is mostly effected by the chemicals of my said formula. For this reason, care is taken in trimming the pole and binding thereon the treating receptacle, not to cut away any of the sap wood portion. Furthermore, the formula embodying my invention is characterized by embodying ingredients which do not injure the wood tissue, nor do the chemicals operate to be self-blocking, during the treating process, against the passage of the solution of the formula through the sap cells.

It has been found that when the wood is treated after the process herein set forth, and then placed in a dry-kiln, that it does not season check or warp nearly as much as when it is kiln-dried without such treatment. Likewise, the discoloration due to dry-kiln operation is lessened.

The facts and conclusions herein contained have been derived from chemical analysis, experience and observation of some 2000 poles treated in accordance with my invention in actual commercial operation.

This is a continuation-in-part of my now pending application Serial No. 673,415 filed May 29, 1933, and is to be substituted therefor with the express understanding that the invention disclosed in said co-pending application is in nowise abandoned hereby.

Obviously, changes may be made in the forms, dimensions and arrangement of the parts of my invention, without departing from the principle thereof, the above setting forth only preferred forms of embodiment.

I claim:

1. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to wash out the sap, i. e., of a sufficiently low pressure to permit substantial retention of sap to permit reaction of the sap and the solution, the solution comprising a water soluble oxide of arsenic; and a water soluble ferro metallic salt.

2. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to completely wash out the sap, the solution comprising a water soluble oxide of arsenic and copper sulphate; and periodically interrupting the treatment and cutting off a section of the end portion of the pole to which the treating solution is applied to present a fresh cross-section of the pole to the treating solution and to facilitate the flow of the solution lengthwise of the cells at a predetermined rate.

3. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to wash out the sap, i. e., of a sufficiently low pressure to permit substantial retention of sap to permit reaction of the sap and the solution, the solution comprising a water soluble oxide of arsenic and zinc sulphate.

4. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to wash out the sap, i. e., of a sufficiently low pressure to permit substantial retention of sap to permit reaction of the sap and the solution, the solution comprising a water soluble oxide of arsenic and iron sulphate.

5. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution comprising a water soluble oxide of arsenic, copper sulphate and zinc sulphate.

6. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution comprising a water soluble oxide of arsenic, copper sulphate and iron sulphate.

7. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution comprising a water-soluble oxide of arsenic, zinc sulphate and iron sulphate.

8. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution comprising a water soluble oxide of arsenic, copper sulphate, zinc sulphate and iron sulphate.

9. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to completely wash out the sap, the solution comprising arsenic trioxide and copper sulphate; and periodically interrupting the treatment and cutting off a section of the end portion of the pole to which the treating solution is applied to present a fresh cross-section of the pole to the treating solution and to facilitate the flow of the solution lengthwise of the cells at a predetermined rate.

10. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to wash out the sap, i. e., of a sufficiently low pressure to permit substantial retention of sap to permit reaction of the sap and the solution, the solution comprising arsenic trioxide and zinc sulphate.

11. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to wash out the sap, i. e., of a sufficiently low pressure to permit substantial retention of sap to permit reaction of the sap and the solution, the solution comprising arsenic trioxide and iron sulphate.

12. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution comprising arsenic trioxide, copper sulphate, and zinc sulphate.

13. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution comprising arsenic trioxide, copper sulphate and iron sulphate.

14. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution comprising arsenic trioxide, zinc sulphate and iron sulphate.

15. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution comprising arsenic trioxide, copper sulphate, zinc sulphate and iron sulphate.

16. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution comprising copper sulphate and zinc sulphate, which remain in solution while under impregnating pressure without objectionable depleting and self-blocking-against-impregnation reactions; and periodically interrupting the treatment and cutting off a section of the end portion of the pole to which the treating solution is applied to present a fresh cross-section of the pole to the treating solution and to facilitate the flow of the solution lengthwise of the cells at a predetermined rate.

17. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution comprising copper sulphate, zinc sulphate and iron sulphate, which remain in solution while under impregnating pressure without objectionable depleting and self-blocking-against-impregnation reactions; and periodically interrupting the treatment a cutting off a section of the end portion of the pole to which the treating solution is applied to present a fresh cross-section of the pole to the treating solution and to facilitate the flow of the solution lengthwise of the cells at a predetermined rate.

18. In the process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to completely wash out the sap, said solution containing reagents which react with the wood to produce non-leachable compounds, the step of periodically interrupting the treatment and cutting off a section of the end portion of the pole to which the treating solution was applied to present a fresh cross-section of the pole to the treating solution and facilitating the flow of the solution lengthwise of the cells at a predetermined rate.

19. In the process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to completely wash out the sap, said solution containing reagents which react with the wood to produce non-leachable compounds, the step of periodically, during treatment, cutting off a section of the end portion of the pole from which the solution escapes, and facilitating the rate of flow of the solution through the pole at a predetermined rate.

20. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution including copper sulphate, zinc sulphate, iron sulphate, and arsenic trioxide which form relatively non-leaching toxic compounds within the sap wood portion of the timber in substantially its natural condition and which remain in solution while under impregnating pressure without objectionable depleting and self-blocking-against-impregnation reactions.

21. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution including the following ingredients in substantially the following proportions, namely, one and one-half pounds of copper sulphate, one and one-half pounds of zinc sulphate, one pound of arsenic trioxide, four ounces of iron sulphate, and ten gallons of water which form relatively non-leaching toxic compounds within the sap wood portion of the timber in substantially its natural condition and which remain in solution while under impregnating pressure without objectionable depleting and self-blocking-against-impregnation reactions.

22. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution consisting of a water soluble oxide of arsenic, copper sulphate and iron sulphate.

23. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure, the solution consisting of a water soluble oxide of arsenic, zinc sulphate and iron sulphate.

24. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to wash out the sap, i. e., of a sufficiently low pressure to permit substantial retention of sap to permit reaction of the sap and the solution, the solution comprising a water soluble oxide of arsenic; and a water soluble zinc salt.

25. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to completely wash out the sap, the solution comprising a water soluble oxide of arsenic; and a water soluble copper salt; and periodically interrupting the treatment and cutting off a section of the end portion of the pole to which the treating solution is applied to present a fresh cross-section of the pole to the treating solution and to facilitate the flow of the solution lengthwise of the cells at a predetermined rate.

26. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to completely wash out the sap, the solution consisting of a water soluble oxide of arsenic and a water soluble copper salt in aqueous solution; and periodically interrupting the treatment and cutting off a section of the end portion of the pole to which the treating solution is applied to present a fresh cross-section of the pole to the treating solution and to facilitate the flow of the solution lengthwise of the cells at a predetermined rate.

27. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to wash out the sap, i. e., of a sufficiently low pressure to permit substantial retention of sap to permit reaction of the sap and the solution, the solution consisting of a water soluble oxide of arsenic and a water soluble zinc salt in aqueous solution.

28. The process of preserving felled green timber having its natural sap comprising impregnating the timber with a toxic and substantially wood non-injuring aqueous solution applied under pressure over the cross section of the timber sufficient to force the said solution through the sap wood portion of the timber longitudinally of the cell structure but insufficient to wash out the sap, i. e., of a sufficiently low pressure to permit substantial retention of sap to permit reaction of the sap and the solution, the solution consisting of a water soluble oxide of arsenic and a water soluble ferro salt in aqueous solution.

MYRON M. CLAPSHAW.